Patented Sept. 26, 1939

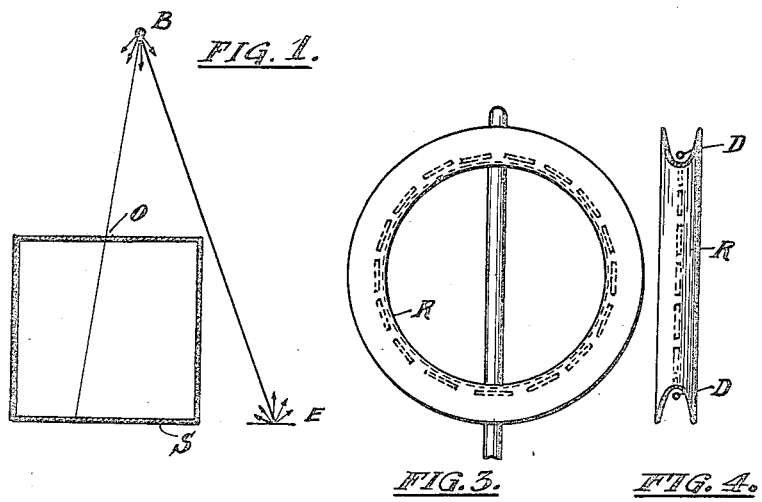
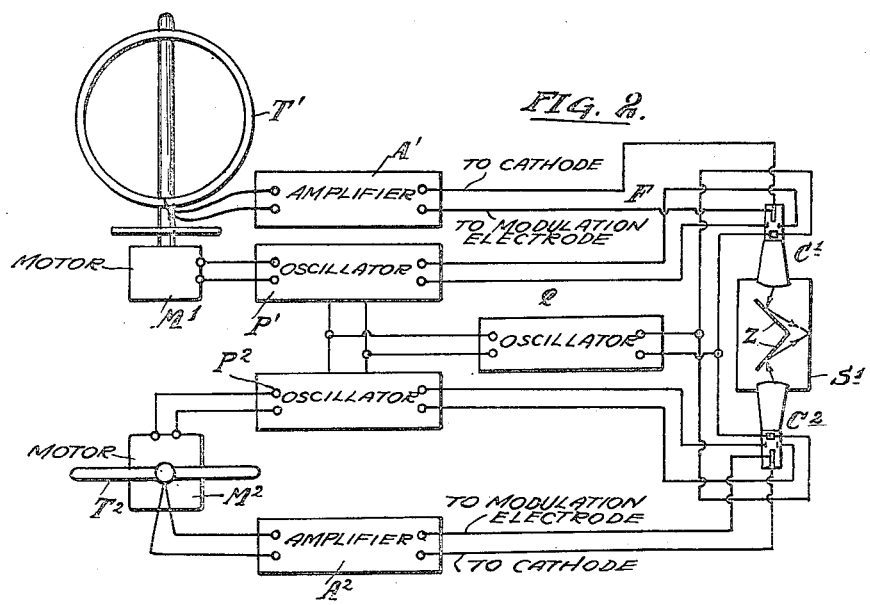

2,174,350

UNITED STATES PATENT OFFICE 2,174,350

THREE-DIMENSION RADIO-BEARING INDICATOR

Ernesto Montù, Milan, Italy

Application December 24, 1936, Serial No. 117,514
In Italy January 31, 1936

6 Claims. (Cl. 250—11)

The present invention relates to radio-electric direction finding and indicating apparatus utilizing two continuously rotated aerials or pick-ups mounted perpendicularly with respect to each other. According to the invention I provide for this purpose an apparatus comprising two directional pick-ups adapted for continuous rotation about axes perpendicular to one another, each of said pick-ups being connected to a cathode-ray tube and associated means whereby the screen of the tube is completely scanned in parallel adjacent lines by the cathode-ray once during each revolution or half-revolution of the pick-up and the intensity of the cathode-ray is governed upon the pick-up being excited by the radiation coming from the aeroplane or the like. The scanning of the screen in parallel adjacent lines may be accomplished, as is known from the television technique, by applying to one pair of plates a saw-tooth voltage and to the other pair a step voltage. Such previously mentioned radiation may for example be emitted from suitably disposed ground stations and received by the apparatus after reflection by the aeroplane or the like. The brief excitation of the pick-ups during each revolution results in lines appearing across the fluorescent screens of the cathode-ray tubes, and owing to the scanning movements of the cathode-rays being maintained in synchronism with the rotation of the pick-ups, it follows that the position of each line corresponds to a certain angular position of the corresponding pick-up. If therefore, for example, one pick-up rotates about a vertical axis while the other rotates about a horizontal axis, the positions of the lines appearing across the screens give an indication of the azimuthal bearing and the angle of elevation of the aeroplane or the like. Two forms of the invention are illustrated in the accompanying drawing, in which Fig. 1 shows in schematic form a "reception chamber" used in case radio waves of ultra-high frequency are employed to obtain the radio bearing of invisible objects. Figure 2 shows in schematic form a radiogoniometric device with two directional rotating radio-pick-ups associated each with the circuit of a cathode-ray tube. Figure 3 shows, front view of an example of rotating directional pick-up. Figure 4 is another view of the same as seen from one edge.

Throughout the views the same reference indicia denote the same or like parts.

In the apparatus shown in Figure 2, $T^1$ and $T^2$ are two directional pick-ups rotated by the motors $M^1$ and $M^2$ and adapted to receive radio-waves of very short wavelength emitted from a station on the ground and reflected by the aeroplane or the like to be detected. One pick-up is rotated about a vertical axis and the other about a horizontal axis and each is associated through an amplifier $A^1$, $A^2$ with the control electrode of a cathode-ray tube $C^1$, $C^2$. By means of a mirror Z coincident images of the fluorescent screens of the cathode-ray tubes are formed on a translucent screen $S^1$.

Each cathode-ray tube is provided in the known manner with two pairs of deflecting plates or coils whereby the cathode ray may be caused to scan the surface of the fluorescent screens in parallel adjacent lines, and $P^1$, $P^2$ and Q indicate diagrammatically the devices for producing the voltages or currents necessary for this purpose. The connections between the devices $P^1$, $P^2$ and Q and the motors $M^1$ and $M^2$ are further intended to indicate that these devices are controlled by the motors so that for each revolution or half-revolution of each pick-up the fluorescent screen of the corresponding cathode-ray tube is completely scanned once. Consequently, if for example the scanning of each screen takes place in 360 lines, each line will correspond to the rotation of the pick-up through one degree in a definite position of orientation. The devices $P^1$, $P^2$ and Q, the cathode ray tubes $C^1$, $C^2$ and the mirror Z are so arranged that the line-scanning directions of the two coincident images on the translucent screen are perpendicular to one another.

Synchronization between the revolutions of the rotating pick-up and the horizontal deflection of the cathode ray can easily be obtained by a well-known method which consists in driving the rotating pick-up together with the rotating arm (contact arm) of a potentiometer having the ends connected to a battery, while the resistance of the potentiometer itself is of circular form and concentric with the axis of the pick-up. The terminals of the contact arm and of the low-potential end of the potentiometric resistance are connected to the plates for horizontal deflection, while the position of the contact arm on one end of the resistance should coincide with the deflection zero of the cathode-ray. This procedure for the application of the step voltage is extensively described in principle in Rider's book "The cathode ray tube at work" Rider, New York, 1935, on pages 20 and 55. Such a mechanical synchronizing system could of course be replaced by an electronic system by substituting the potentiometer with an electronic sweep circuit as shown in the same book on page 58, and synchronizing this circuit with the motor which drives the rotating pick-up by one of the many methods well-known to those skilled in the art.

When the two rotating directional pick-ups are not excited by radio-waves received from the aeroplanes or the like to be detected, the two cathode-rays are suppressed or reduced to a minimum intensity by means of suitable bias applied to the control electrodes in known manner. When either of the two pick-ups becomes excited by radio-waves reflected from the aeroplanes or the like, the induced oscillations are amplified detected and applied to the control electrode of the respective cathode-ray tubes, with the result that the full intensity of the cathode-ray is restored for a brief period and a visible line appears on the translucent screen in a position corresponding to the orientation of the pick-up in question. In a similar manner, by the action of the other pick-up and its associated devices, another line, at right-angles to the first also appears on the translucent screen, and the two lines together serve to indicate continuously the azimuthal bearing and angle of elevation of the aeroplane or the like.

Instead of the two separate cathode-ray tubes and the mirror arrangement Z, a single tube can be used having two electron guns and associated control devices so arranged that each cathode-ray scans the same area of the fluorescent screen, the direction of the line-scanning movements of the two cathode rays being perpendicular to one another.

The double beam cathode ray tube which I prefer to use is of the type disclosed by M. Von Ardenne in Electronics for October 1936, on page 31, and it is but necessary to arrange the two beams so that the visible lines produced in scanning by each beam on the fluorescent screen are disposed at right angles with each other.

Furthermore, it may be stated that the dipoles which are part of the rotating pick-up are connected to the receiver through a transmission line as it is common practice in the reception of ultra-short waves. The transmission line is naturally so designed as to have the correct impedance match on the antenna side and on the receiver side. If more than one dipole is used, the dipoles must be connected in parallel and so as to have the proper phase relations.

This is well set forth in useful manner in the Radio Amateur's Radio Handbook, on page 322 et seq., issued by the American Radio Relay League.

As common frame aerials are not sufficiently directional, it is preferred to use pick-up devices of the kind shown diagrammatically in Figures 3 and 4 which are made to rotate about an axis and consist of one or more dipoles D arranged at the focus of a concentrating reflector R which also acts as a screen. It may be noted that I have herein described the principle and operation of my invention, together with the apparatus which I now consider to represent the best embodiment thereof, but I desire to have it understood that the apparatus shown is illustrative only and that the invention can be carried out by other means. Also, while it is designed to use the various features and elements in the combination and relations described, some of these may be altered and others omitted without interfering with the more general results outlined, and the invention extends to such use.

The optical system of the present invention, in its simplest form consists simply of the two mirrors and of a translucent screen as already disclosed. The two cathode ray tubes are so disposed with reference to the two mirrors that the visible lines are each reflected from the associated mirror, so as to intersect at right angles on the translucent screen. To effect this, the center points of the two fluorescent screens must coincide (after being reflected by the mirrors) on the translucent screen. If the translucent screen is horizontally disposed, in order to have the right angle intersection, one cathode ray tube is so disposed that the visible line on its screen is vertical, and the other cathode ray tube so that the visible line is horizontal. The axis of both cathode ray tubes coincide and form one horizontal line, while the inclination of the two mirrors must be such as to satisfy the requisite of coincidence of the two reflected center points of the fluorescent screens, after reflection. It is pointed out that while it might appear to a casual observer that any known pick-up should operate in the present system, I have ascertained by observation and considerable experiment that the specific type of pick-up described hereinbefore is indispensable for the scope of the invention, because it is the only one which is capable of providing the necessary sharp directionality on which the operation of the whole device is based. Every other known type of rotatable antenna does not give an indication sharp enough to have only a small visible line appear on the fluorescent screen of the cathode ray tube, but produces a useless wide band. It is clear, that if this line or band is too broad, the intersection of such two broad lines is no mere point but an area, and that therefore the bearing obtained is very inaccurate, and hence, unreliable.

Having described my invention, what I claim and desire to secure by Letters Patent is:

1. Electrical apparatus for detecting and obtaining the bearings of aeroplanes and other moving objects, by means of electromagnetic radiation, comprising two directional aerial pick-ups mounted for continuous rotation about axes which are perpendicular to each other, a cathode ray tube having a screen connected to each of said pick-ups and associated electrical control means causing the screen of the tube involved to be completely scanned in regularly adjacent parallel lines by the cathode ray at least once during each revolution of the pick-up and the intensity of the cathode ray to be varied upon excitation of the pick-up by the radiation coming from the aeroplane or moving object, so that each scanning line on the screen of the tube involved corresponds to a definite angular orientation of the associated rotating pick-up.

2. Apparatus according to claim 1, wherein each cathode ray tube is provided with a control electrode, and means are included for applying to said electrode a potential responsive to the excitation of the pick-up and a potential capable of suppressing the cathode ray when the pick-up is idle and not excited, so as to cause a maximum of intensity of the cathode ray to correspond to the angular position of the rotating pick-up, while said pick-up is excited by the incoming radiations.

3. Apparatus according to claim 1, wherein a third screen and an optical arrangement are included which causes the coincident images of the two screens of the cathode ray tubes to be formed on said third screen, and the line scanning directions of the two coincident images to be perpendicular to each other.

4. Apparatus according to claim 1, wherein each cathode ray tube is provided with a control electrode, and means are included for applying to said electrode a potential responsive to the excitation of the pick-up and a potential capable of suppressing the cathode ray when the pick-up is idle and not excited, so as to cause a maximum of intensity of the cathode ray to correspond to the angular position of the rotating pick-up, while said pick-up is excited by the incoming radiations, wherein a third screen and an optical arrangement are included which causes the coincident images of the two screens of the cathode ray tubes to be formed on said third screen, and the line scanning directions of the two coincident images to be perpendicular to each other.

5. Apparatus according to claim 1, wherein each aerial pick-up comprises one or more dipoles, a concentrating reflector having a focus, said one or more dipoles being associated with and at the focus of the concentrating reflector, and means causing the pick-up to rotate about a predetermined axis so as to cause said dipole to be excited only for a sharp direction of arrival of the reflected ray.

6. Apparatus according to claim 1, wherein each cathode ray tube is provided with a control electrode, and means are included for applying to said electrode a potential responsive to the excitation of the pick-up and a potential capable of suppressing the cathode ray when the pick-up is idle and not excited, so as to cause a maximum of intensity of the cathode ray to correspond to the angular position of the rotating pick-up, while said pick-up is excited by the incoming radiations, wherein each aerial pick-up comprises one or more dipoles, a concentrating reflector having a focus, said one or more dipoles being associated with and at the focus of the concentrating reflector, and means causing the pick-up to rotate about a predetermined axis so as to cause said dipole to be excited only for a sharp direction of arrival of the reflected ray.

ERNESTO MONTÙ.